United States Patent [19]
Hirabayashi

[11] Patent Number: 5,221,108
[45] Date of Patent: Jun. 22, 1993

[54] AIRBAG COVER

[75] Inventor: Hirokazu Hirabayashi, Kanagawa, Japan

[73] Assignee: Nissan Motor Co., Ltd., Yokohama, Japan

[21] Appl. No.: 769,708

[22] Filed: Oct. 2, 1991

[30] Foreign Application Priority Data

Oct. 2, 1990 [JP] Japan .................................. 2-264523

[51] Int. Cl.⁵ .............................................. B60R 21/16
[52] U.S. Cl. .................................................. 280/728
[58] Field of Search ............... 280/728, 730, 731, 732, 280/743; 150/154

[56] References Cited

U.S. PATENT DOCUMENTS

| | | | |
|---|---|---|---|
| 2,904,128 | 9/1959 | Bonham | 150/154 |
| 3,853,334 | 12/1974 | Auman et al. | 280/728 |
| 4,334,699 | 6/1982 | Patzelt | 280/731 |
| 5,096,220 | 3/1992 | Nakajima | 280/728 |

FOREIGN PATENT DOCUMENTS 50-127336 10/1975 Japan .................................. 280/731
63-155868 10/1988 Japan .

Primary Examiner—Karin L. Tyson
Attorney, Agent, or Firm—Pennie & Edmonds

[57] ABSTRACT

An airbag cover for covering an airbag stored in its folded state within a steering wheel or instrument panel of an automobile. The air bag cover is formed of a planar woven fabric having two pair of cut-outs, each pair being two cut-outs diagonally opposite from each other. The woven fabric consists of a warp yarn and a weft yarn, with the warp yarn having a weave parallel to a line connecting one of the two pair of cutouts and the weft yarn having a weave parallel to a line connecting the other pair of cutouts. The warp and weft, by extending parallel between cutouts, facilitates ready tearing of the cover between the cutouts when the bag is inflated.

10 Claims, 4 Drawing Sheets

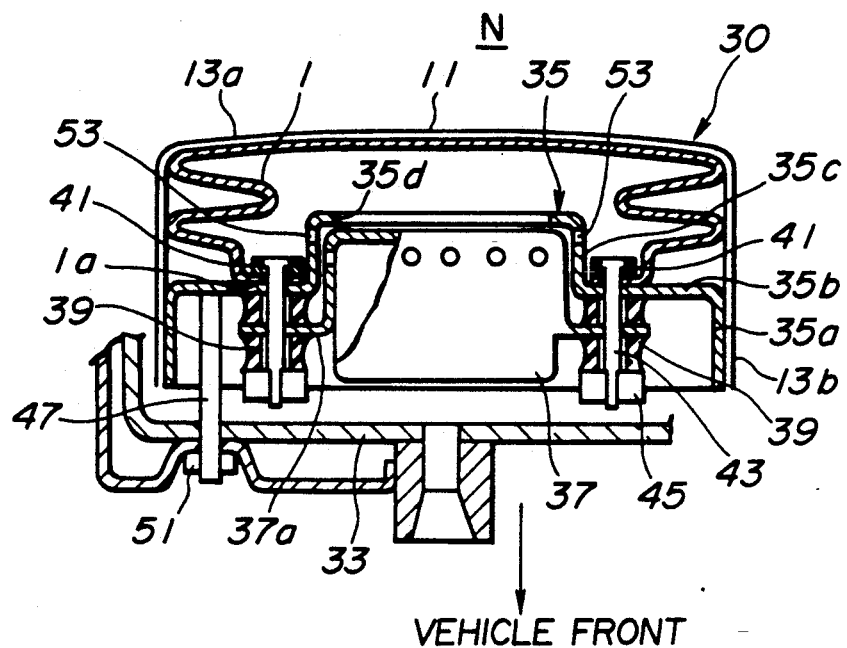
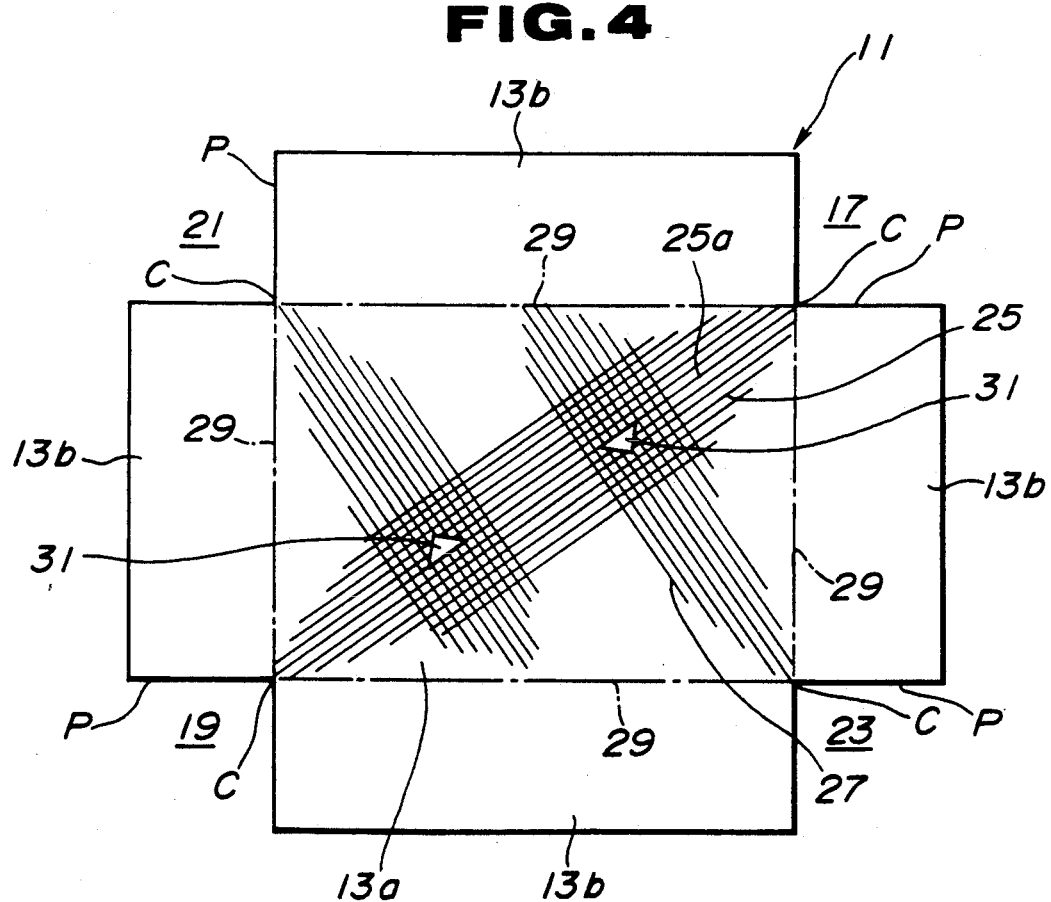

AIRBAG COVER

BACKGROUND OF THE INVENTION

1. Field of the Invention

This invention relates to improvements in an airbag cover for covering at least a part of an airbag stored in its folded state, for example, inside a padded center of a steering wheel or an instrument panel.

2. Description of the Prior Art

Hitherto a variety of airbag restraint systems have been proposed and put into practical use. These systems are usually arranged as follows: When a deceleration at a vehicle collision is over a predetermined level, an initiator is ignited to start the operation of an inflator or gas generator, thereby inflating and developing an airbag folded state. Accordingly, a vehicle passenger is protected from coming into direct contact with an instrument panel and/or a front windshield. Such airbag restraint systems are usually provided separately for a driver seated on a driver's seat and for a vehicle passenger seated on a front seat beside the driver's seat. The airbag is stored in a padded center of a steering wheel for the driver while inside an instrument panel for the passenger beside the driver.

The thus stored airbag in its folded state is usually covered with an airbag cover to protect the airbag and keep the airbag in the folded state. The airbag cover is required to be readily and instantaneously broken to allow the air bag to smoothly inflate and project toward the driver or passenger through the broken airbag cover in a vehicle collision. In order to meet such a requirement, Japanese Utility Model Provisional Publication No. 63-155868 discloses an airbag cover which is generally box-shaped and formed of plastic. In this arrangement, a door-like structure is integrally formed at the front section of the cover, in which a fragile part is formed along the periphery of the door-like structure. A mesh member is embedded in the cover in a manner to avoid the fragile part, in which the mesh member at a position corresponding to the hinge of the door-like structure serves as a reinforcement member. With this arrangement, when the airbag inflates, the fragile part is broken and therefore the door-like structure turns around the hinge to open, thereby allowing the airbag to smoothly inflate to receive the face of the driver or passenger.

Another, another air bag cover as shown in FIGS. 5 and 6 of the drawings of the present application has been proposed, in which four nettings 3a, 3b, 3c, 3d disposed in a manner to cover an airbag 1', are embedded in foamed polyurethane. Each netting is generally L-shaped in section. In this airbag cover, a fragile part 5a is formed at the central portion of an upper section of the foamed polyurethane at which the ends of the nettings 3b, 3c are opposite to each other, maintaining a space therebetween, as shown in FIG. 6. With this arrangement, in a vehicle collision, high pressure gas is fed from an inflator to cause the airbag to inflate. Under the inflating force of the airbag, the airbag cover is broken along the fragile part 5a and the airbag develops toward a driver or a passenger, thereby receiving the face of the driver or the passenger.

However, drawbacks have been encountered in the above discussed airbag cover arrangements. In the case of the former conventional airbag cover disclosed in Japanese Utility Model Provisional Publication No. 63-155868, the mesh member is embedded in the plastic body, and therefore the structure of the airbag cover is unavoidably complicated, increasing the steps of the production process, and thereby raising the production cost.

In case of the latter airbag shown in FIGS. 5 and 6, the four nettings are covered with the foamed polyurethane in a manner to be embedded, and therefore a complicated plastic molding process is necessary while requiring a skilled worker during production of the airbag cover. This also increases the production cost of the airbag cover.

SUMMARY OF THE INVENTION

An object of the present invention is to provide an improved airbag cover which can overcome the drawbacks encountered in conventional similar airbag covers.

Another object of the present invention is to provide an improved airbag cover which is facilitated in production while lowering the production cost thereof.

A further object of the present invention is to provide an improved airbag cover which is formed of a planar woven fabric thereby simplifying a production process and decreasing the number of constituent parts.

An airbag cover of the present invention is for covering at least a part of an airbag stored in its folded state. The airbag cover comprises a woven fabric structure fixedly secured relative to an inflator and has a generally cross development shape so that a first pair of diagonally opposite cutouts and a second pair of diagonally opposite cutouts are formed, said woven fabric structure being woven with warp yarns and weft yarns, at least one of said warp yarns and said weft yarns extending in a direction parallel with a line connecting said pair of diagonally opposite cutouts.

Accordingly, by virtue of a yarn arrangement in which the warp yarns and/or the weft yarns are directed to extend so as to connect the diagonally opposite cutouts of the woven fabric structure in its development shape, the woven fabric of the structure can be readily torn or broken along the diagonally located warp or weft yarns when the airbag inflates upon being supplied with high pressure gas from the inflator during a vehicle collision. As a result, the airbag can smoothly develop toward the face of the driver or the passenger.

Additionally, since the airbag cover of the present invention is formed of a woven fabric, it facilitates in production and lowers production cost, while removing the need for skilled workers in the production thereof, particularly as compared with conventional ones which are produced under a plastic molding.

BRIEF DESCRIPTION OF THE DRAWINGS

FIG. 3 is a vertical sectional view of an airbag unit including the airbag cover of FIG. 1;

FIG. 4 is a development elevation of another embodiment of the airbag cover in accordance with the present invention;

DETAILED DESCRIPTION OF THE INVENTION

Figure 1:
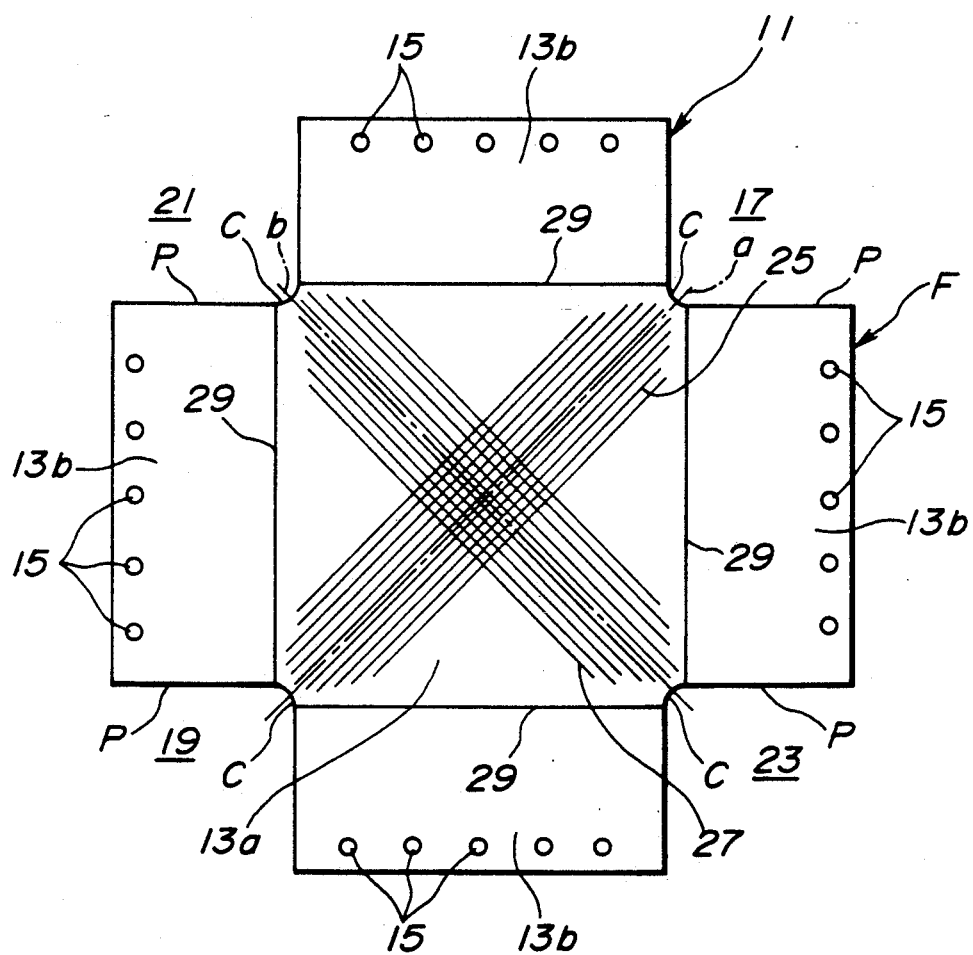
FIG. 1 is a development elevation of an embodiment of an airbag cover in accordance with the present invention.
Figure 2:
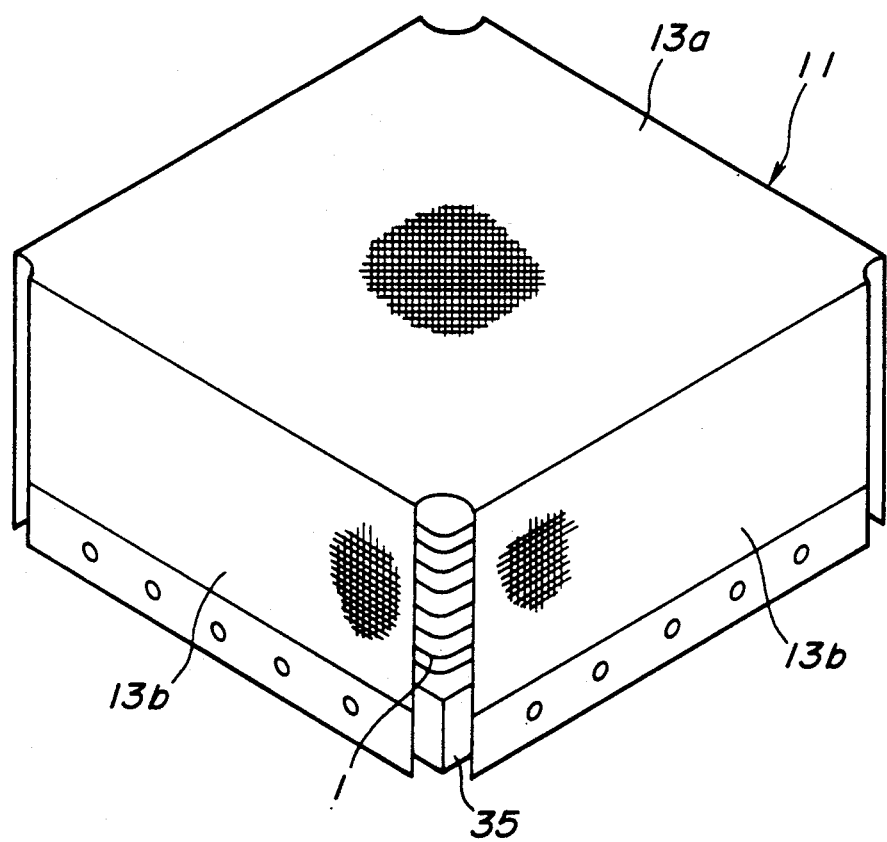
FIG. 2 is a perspective view of the airbag cover of FIG. 1 in its operational condition.
Figure 5:
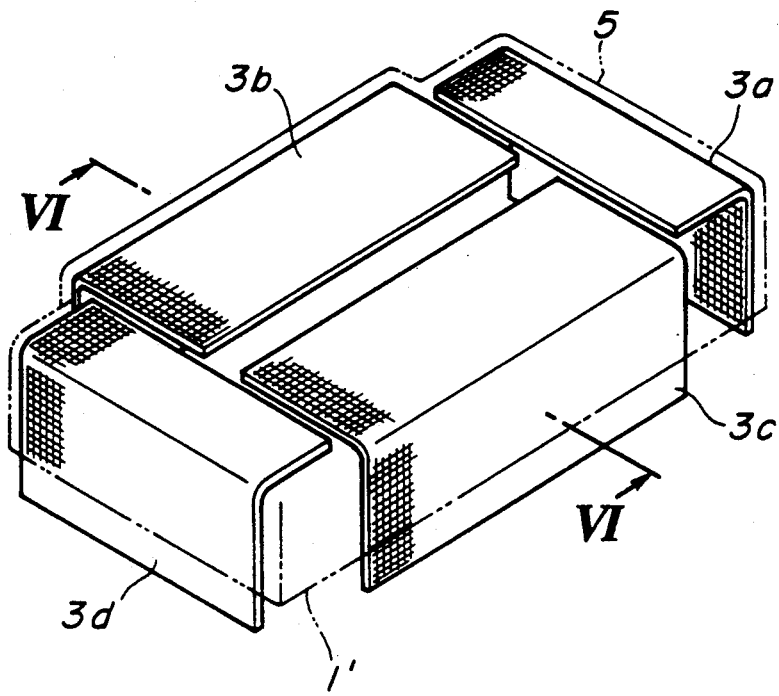
FIG. 5 is a perspective view showing a production process of a conventional airbag cover.
Figure 6:
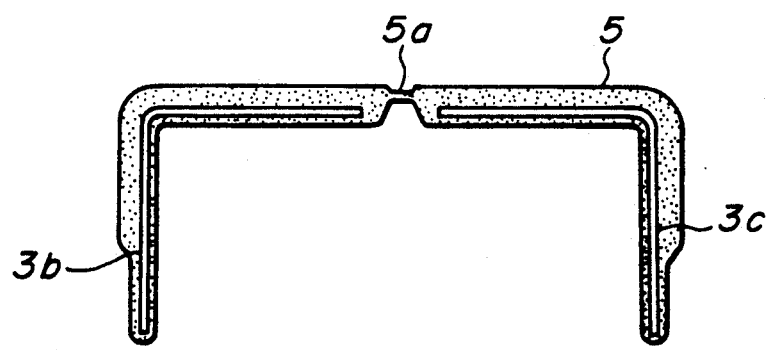
FIG. 6 is a cross-sectional view taken in the direction of arrows substantially along the line VI—VI of FIG. 5.

Referring now to FIGS. 1 to 3 of the drawings, an embodiment of an airbag cover according to the present invention is illustrated by the reference numeral 11. The airbag cover 11 is for covering at least a part of an airbag 1 which is stored in its folded state as shown in FIG. 3. The airbag 1 forms part of an airbag restraint system in which the airbag 1 is inflated automatically, at any time a front-end collision occurs, under the influence of high pressure gas generated from an inflator 37 thereby to protect a driver or a vehicle passenger (not shown) from coming into direct contact with either a steering wheel (not shown) or a windshield (not shown) of an automotive vehicle.

The cover 11 is of the three-dimensional structure shown in FIG. 2 in use and formed of a planar woven fabric F shown in FIG. 1. The woven fabric F is prepared by cutting out four corners (in rectangular shape) of a rectangular planar woven fabric (not shown), removing the four corners in the generally rectangular shape. In other words, the cover 11 has a generally cross development shape or is generally cross-shaped in a development elevation. In this embodiment, the planar woven fabric F is formed by cutting out the four corners (in generally square shape) of the generally square woven fabric F, forming four cutouts 17, 19, 21, 23. Each cutout 17, 19, 21, 23 is defined by a generally L-shaped peripheral portion P of the woven fabric F at one of four corners. As shown, the two outouts 17, 19 are diagonally opposite to each other, and the two counts 21, 23 are diagonally opposite to each other. Accordingly, the resultant planar woven fabric F comprises a generally square central part 13a, and generally rectangular side parts 13b, 13b, 13b, 13b.

More specifically, each side part 13b is integrally connected with the central part 13b at a linear portion corresponding to each side of the central part 13b in the development elevation. Along this linear portion, a bending line 29 is shown to extend, in which the planar woven fabric F is bent at these bending lines 29 to form the three-dimentional cover 11 as shown in FIG. 2. Thus, the respective side parts 13b, 13b, 13b, 13b are arranged to extend respectively in four outward directions from the central part 13a.

The planar woven fabric F is woven with warp yarns 25 and weft yarns 27 which cross with each other at generally right angles. The warp yarns 25 extend generally parallel with, shown as a, straight line a connecting the opposite depressed corners C of the L-shaped peripheral portions P, P which respectively define the outouts 17, 19. In other words, the straight line a generally corresponds to a diagonal line of the generally square central part 13a. The weft yarns 27 extend generally parallel with another straight line, b, connecting the opposite depressed corners C of the L-shaped peripheral portions P, P which respectively define the cutouts 21, 23. In other words, the straight line b generally corresponds to a diagonal line of the generally square central parts 13a. In this embodiment, each L-shaped peripheral portion corner C is rounded as shown in FIG. 1.

Each side part 13b is formed with installation holes 15 through which side part 13b is fixedly secured to a base plate 35 which will be discussed below. The installation holes 15 are located near and aligned along the end (opposite to the bending line 29) of the side part 13b. It will be understood that the installation holes 15 may be omitted in case each side part 13b is directly fixed to the base plate 35.

The above discussed planar woven fabric F is formed into the airbag cover 11 of the three-dimentional shape as shown in FIG. 2 by bending each side parts 13b by an angle of about 90 degrees along each bending line 29. In this embodiment, the thus bent side parts 13b, 13b, 13b, 13b are fixedly secured to the base plate 35 to which the bottom part of the airbag 1 is sealingly fixed. In FIG. 2, the airbag 1 is stored in its folded state inside the cover 11.

With the structure of the airbag cover 11, the diagonally located warp yarns 25 extend to connect the opposite cutouts 17, 19 located opposite one another diagonally and formed at the opposite corners of the fabric F. Accordingly, when the airbag 1 inflates under gas pressure supplied therein, the central part 13a of the woven fabric F tends to easily tear along the warp yarns 25 or along the diagonal line thereof. In other words, the cutouts 17, 19 serve as fragile or easily breakable portions in the cover 11, and the warp yarns 25 are set to connect these fragile portions thereby increasing an ability of breaking the cover 11.

Similarly, the diagonally located weft yarns 27 extend to connect the opposite one another cutouts 21, 23 located opposite diagonally and formed at the opposite corners of the fabric F. Accordingly, it will be appreciated that the thus set weft yarns 27 contribute to allowing the airbag cover 11 to be easily breakable as well as the warp yarns 25.

An example installation of the thus formed airbag cover 11 will be discussed with reference to FIG. 3.

An airbag unit 30 in which the airbag 1 is stored in its folded state is disposed in a passenger compartment N of the automotive vehicle (not shown). In this instance, the airbag unit 30 is for a driver's seat (not shown) on which a driver is seated, and is therefore mounted in a steering wheel 33. The airbag 1 in the folded state is sealingly fixed at its bottom part with the base plate 35. The base plate 35 includes a base section 35a defining thereinside a hollow. An upper wall 35b is integral with the base section 35a. A generally cylindrical portion 35c is integral with the upper wall 35b and extends upwardly from the upper wall 35b in FIG. 3, forming a top opening 35d. The top opening 35d is located inside the airbag 1 in the folded state.

The airbag cover 11 is disposed to cover the folded airbag 1 and fastened to the base plate 35 in such a manner that each side part 13b is fixed to the base portion 35a of the base plate 35. The cover 11 is located such that the outer surface of the central part 13a thereof faces the driver on the driver's seat. An inflator 37 is disposed inside the base plate 35 so that high pressure gas generated from the the inflator 37 is ejected through the top opening 35d into the inside of the airbag 1. The inflator 37 is provided with an installation flange section 37a which projects laterally from the outer wall of the inflator 37. The installation flange section 37a is fixedly secured to the upper wall 35b of the base plate 35 by means of bolts 43 and nuts 45 through sealing members 39 made of rubber or the like and washers 41.

The airbag 1 is formed at its bottom part with an opening (no numeral) defined by a peripheral portion 1a. The peripheral portion 1a of the airbag 1 is sealingly interposed between the washer 41 and the upper wall 35b of the base plate 35. Screw shafts 47 are provided to extend from the the steering wheel 33 to the upper wall 35b of the base plate 35 so that the base plate 35 is securely fixed to the steering wheel 33. One end portion of each screw shaft 47 is in contact with the base plate upper wall 35b while the other end portion thereof projects out of the steering wheel 33 and is fixed there by means of a lock nut 51.

The cylindrical portion 35c of the base plate 35 is formed with a plurality of gas discharge holes 53 through which gas from the inflator 37 is ejected to the inside of the airbag 1. It will be understood that the inflator 37 is adapted to start to operate to generate high pressure gas when a vehicle collision occurs, i.e., when an input signal from an collision or acceleration sensor (not shown) indicates that a deceleration in vehicle speed is over a predetermined level.

In operation, when a vehicle collision occurs, a firing unit (not shown) disposed in the inflator is operated in accordance with the signal from the collision sensor thereby to start the operation of the inflator 37. Then, high pressure gas is generated from the inflator 37 and ejected to the inside of the airbag 1 through the gas discharge openings 53 and the top openings 35d of the base plate 35. The thus ejected gas causes the airbag 1 to momentarily inflate. During the inflation of the airbag 1, the cover 11 is torn or broken along the warp yarns 25 and/or the weft yarns 27 shown in FIG. 1, and therefore the airbag 1 inflates and develops in the direction of the driver or the passenger in the passenger compartment N to receive the face of him/her, thus softening an impact applied against the driver during the vehicle collision.

FIG. 4 illustrates the planar woven fabric 11 for another embodiment of the airbag cover F according to the present invention, which is similar to that of the first embodiment of FIG. 1. In this embodiment of the airbag cover 11, the central part 13a is shaped rectangular and therefore the weft yarns 27 are not extending in a direction to connect the diagonally opposite counts 21, 23 or along the diagonal line (not shown) of the rectangular central part 13a while the warp yarns 25 are extending in the direction to connect the diagonally opposite cutouts 17, 19 or along the diagonal line (not shown) of the central part 13a. In view of this, according to this embodiment, in order to obtain such a characteristics that the airbag cover 11 tends also to easily tear or break along the extending direction of the weft yarns 27, a suitable number of openings 31, 31 are formed in the central part 13a of the woven fabric F. Each opening 31 is located at or near portions at which a central warp yarns 25a crosses two weft yarns reaching the respective corners C of the L-shaped peripheral portions P (of the woven fabric F) each defining the cutout 21, 23. The central wary yarn 25a has the opposite ends which respectively reach the corners C of the L-shaped peripheral portions P (of the woven fabric F) each defining the cutout 17, 19. In other words, the central warp yarn 25a is located along a diagonal line (not shown) of the central part 13a. In this embodiment, each opening 31 is shaped triangular. It will be appreciated that the thus formed openings 31 improve the tearing or breaking characteristics of the airbag 11.

While the airbag cover 11 of the embodiments shown have been described as being used in the airbag unit 30 installed on the steering wheel to be operable for a driver on a driver's seat, it will be understood that the airbag cover of the present invention may be used in the airbag unit disposed in an instrument panel to be operable for a vehicle passenger on a front seat beside the driver's seat.

What is claimed is:

1. In an airbag system for a vehicle, in which an airbag is normally stored in a folded state with an airbag cover for covering at least any exposed part of said airbag while stored in the folded state, said airbag cover being designed to rupture to permit said airbag to inflate upon detection of an impact, the improvement wherein said airbag cover comprises:

a woven fabric woven with weft and warp yarns having a central portion defined by a peripheral ending portion and side portions extending from said peripheral ending portion, said side portions being bent about said peripheral ending portion to form a three-dimensional cover for covering said airbag, wherein said central portion is further defined by a first pair of diametrically opposed cutouts, in which a first imaginary line connecting each cutout of said first pair extends across said central portion; and a second pair of diametrically opposed cutouts, in which a second imaginary line connecting each cutout of said second pair extends across said central portion about perpendicular to said first imaginary line, wherein said warp yarns extending in a direction substantially parallel with said first imaginary line and said weft yarns extending in a direction substantially parallel with said second imaginary line to cause said airbag cover to rupture substantially parallel to said first and second imaginary lines.

2. In an airbag system for a vehicle, in which an airbag is normally stored in a folded state with an airbag cover for covering at least any exposed part of said airbag while stored in the folded state, said airbag cover being designed to rupture to permit said airbag to inflate upon detection of an impact, the improvement wherein said airbag cover comprises:

a three dimensional woven fabric structure woven with weft and warp yarns defining a hollow cavity defined by bending a planar woven fabric having a planar central portion and planar side portions extending from peripheral edges thereof which form a cross-shaped planar woven fabric, said side portion being bent about said peripheral edges to form a three-dimensional cover for covering said airbag, said structure being fixedly connected to a support means surrounding said hollow cavity, said planar woven fabric having a first and a second cutout which are located generally diametrically opposed to each other and third and fourth cutouts which are located generally diametrically opposed to each other, at least one of said warp yarns and said weft yarns extending in a direction substantially parallel with an imaginary line which connects said first and second cutouts or said third and fourth cutouts to cause said airbag cover to rupture substantially parallel to said imaginary line.

3. An airbag cover as claimed in claim 2, wherein said cross-shaped planar woven fabric has first and second generally L-shaped peripheral portions which respectively define said first and second cutouts, said first and second L-shaped peripheral portions including, respectively, first and second indented corners which are generally diametrically opposed to each other; and third and fourth generally L-shaped peripheral portions which respectively define said third and fourth cutouts, said third and fourth L-shaped peripheral portions including, respectively, third and fourth indented corners which are generally diametrically opposed to each other, wherein said imaginary line extends to connect said diagonally opposite indented corners.

4. An airbag cover as claimed in claim 3, wherein said cross-shaped planar woven fabric includes a generally rectangular central portion, and four generally rectangular sides, each of which is integrally connected with four edges of said rectangular central portion.

5. An airbag cover as claimed in claim 4, wherein said three-dimensional woven fabric structure is formed by bending said four sides along the four edges of said rectangular central portion.

6. An airbag cover as claimed in claim 5, wherein said three-dimensional woven fabric structure is located with said central portion facing a vehicle passenger.

7. An airbag cover as claimed in claim 2, wherein said warp yarns extend in a direction parallel with a first imaginary line connecting said first and second cutouts, and said weft yarns extend in a direction parallel with a second imaginary line connecting said third and fourth cutouts.

8. An airbag cover as claimed in claim 2, further comprising a plurality of openings in said planar woven fabric, each of said openings being located at a position around an intersecting position at which a center warp yarn in said warp yarns crosses one of said weft yarns.

9. An airbag cover as claimed in claim 8, wherein said one of said weft yarns reaches one of said cutouts.

10. In an airbag system for a vehicle, in which an airbag is normally stored in a folded state with an airbag cover for covering at least any exposed part of said airbag while stored in the folded state, said airbag cover being designed to rupture to permit said airbag to inflate upon detection of an impact, the improvement wherein said airbag cover comprises:

a woven fabric means formed with woven weft and warp yarns having at least first and second pairs of diametrically opposed cut outs defining a predetermined tear out area in said woven fabric means;

means for permitting tearing, in response to an inflating force of fan airbag, of said woven fabric means substantially parallel to a first imaginary line formed between said first pair of diametrically opposed cut-outs and substantially parallel to a second imaginary line formed between said second pair of diametrically opposed cut-outs, said tearing permitting means comprising said warp yarns extending substantially parallel to said first imaginary line and said weft yarns extending substantially parallel to said second imaginary line to permit said airbag cover to rupture substantially parallel to said first and second imaginary lines.

* * * * *